Sept. 2, 1924.                     G. A. SNYDER                        1,507,262
                                   REDUCING VALVE
                                Filed Dec. 5, 1921            3 Sheets-Sheet 2

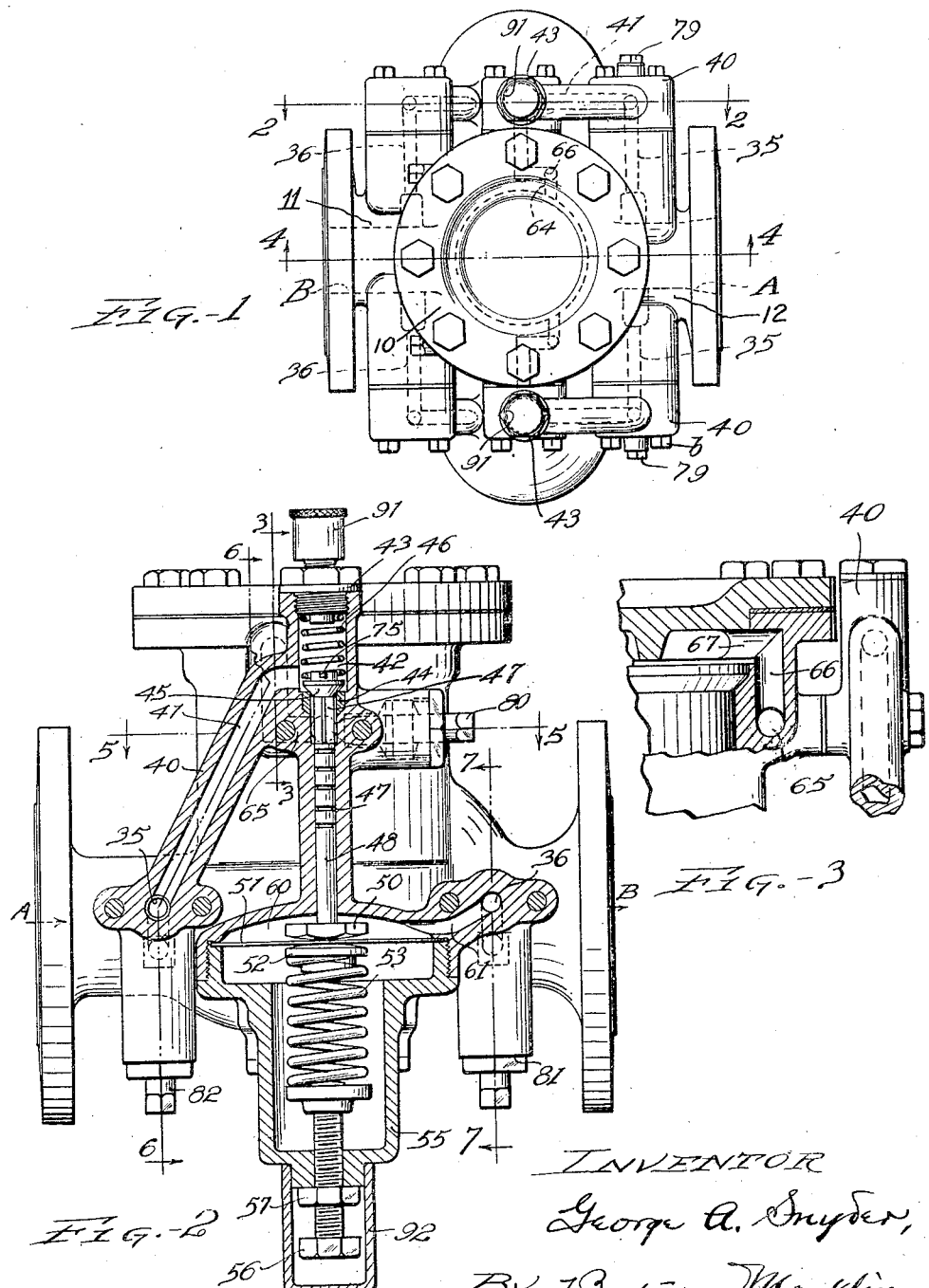

INVENTOR
George A. Snyder,
By Bates & Macklin,
ATTORNEYS

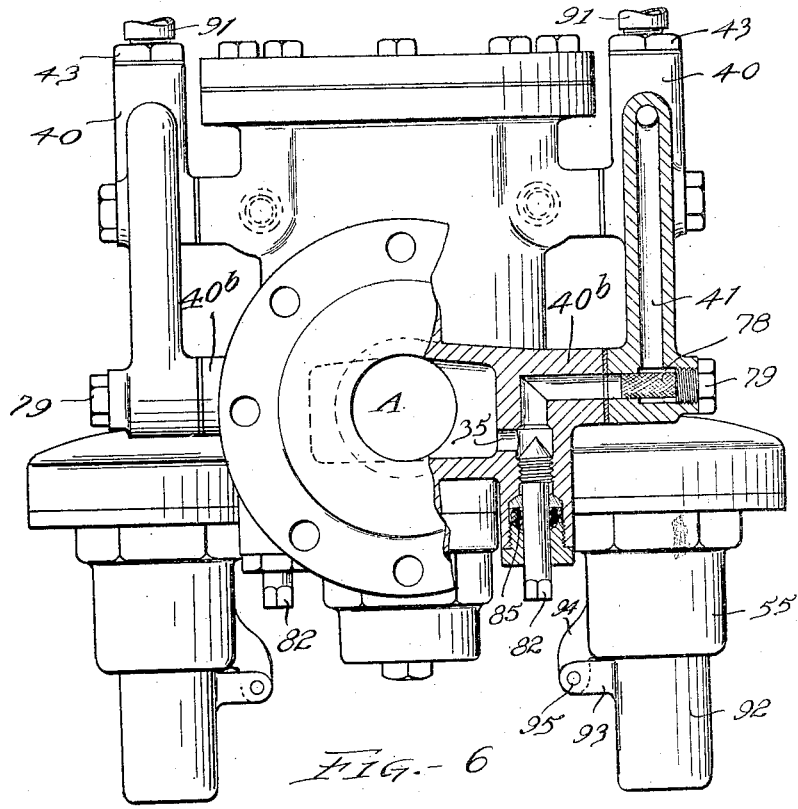
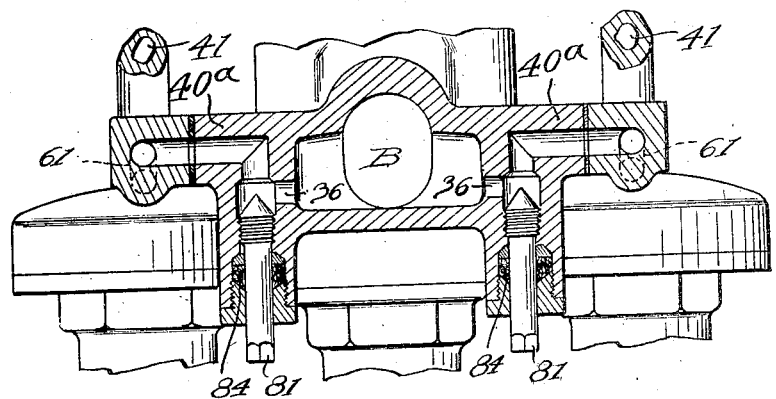

Patented Sept. 2, 1924.

1,507,262

UNITED STATES PATENT OFFICE.

GEORGE A. SNYDER, OF FOSTORIA, OHIO.

REDUCING VALVE.

Application filed December 5, 1921. Serial No. 519,947.

*To all whom it may concern:*

Be it known that I, GEORGE A. SNYDER, a citizen of the United States, residing at Fostoria, in the county of Seneca and State of Ohio, have invented a certain new and useful Improvement in Reducing Valves, of which the following is a full, clear, and exact description, reference being had to the accompanying drawings.

This invention relates to a valve mechanism and has particular reference to a reducing valve so constructed that fluid at a uniform pressure may be supplied from a source of higher pressure.

The general object of the invention is to provide an improved reducing valve wherein the main valve is operated by an auxiliary valve and wherein the parts may be readily manufactured and easily repaired.

A particular object of the invention is to provide in a reducing valve having a main valve, a plurality of auxiliary valves so arranged, with relation to the main valve, that either auxiliary valve may be made to function, while the other may be disconnected and removed for repair without in any way impairing the efficiency or interfering with the operation of the reducing valve.

Another object of the invention is to provide a reducing valve in which the valve parts may be readily repaired or replaced and in which the valve seats may be reground without the necessity of dismantling the entire valve.

An additional object of the invention is to provide in connection with a reducing valve, suitable means for lubricating the valve structure to thereby decrease the wear of the moving parts.

Another feature of the invention is to provide for use in a reducing valve employing spring pressed main valve and an auxiliary valve, a separate replaceable container for the spring of the main valve, which container is out of contact with the fluid passing through the valve so that the injurious effects of foreign substances in the fluid passing through the valve cannot damage the spring.

A further object of the invention is to provide suitable means whereby the inlet side of a reducing valve may be drained of foreign matter and wherein suitable screening devices may be provided to prevent the access of small particles to the auxilliary valve.

Other objects of the invention will be apparent in the following description taken in connection with the accompanying drawings.

Figure 4:
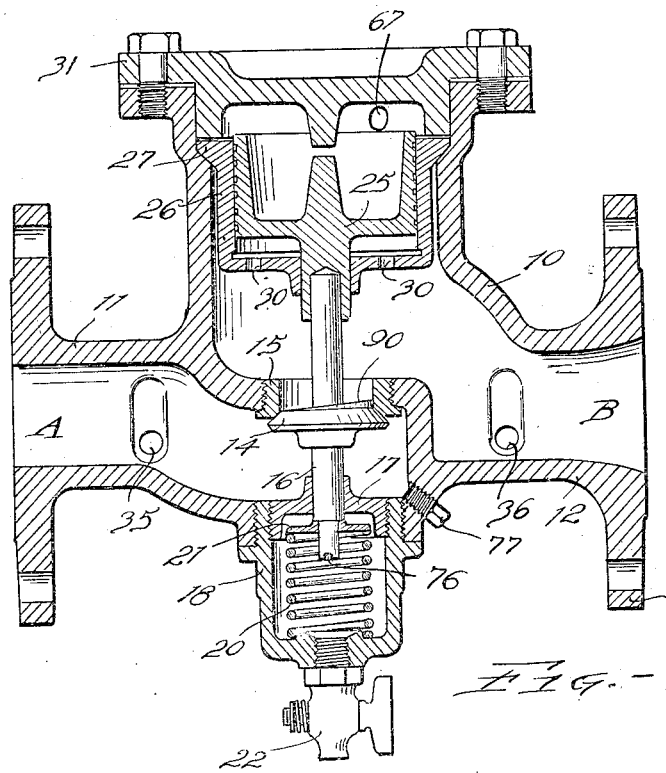
Figure 5:
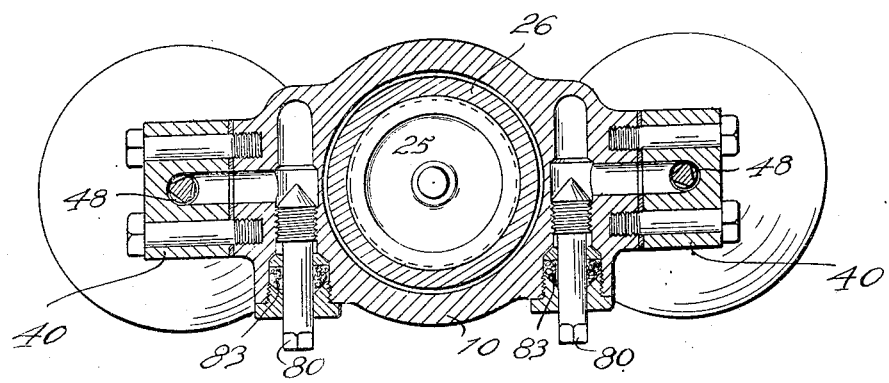

Fig. 1 is a top plan view of the reducing valve constructed according to my invention; Fig. 2 is a section on the line 2—2, Fig. 1; Fig. 3 is a section partly in elevation on the line 3—3, Fig. 2; Fig. 4 is a section on the line 4—4 of Fig. 1; Fig. 5 is a section on line 5—5, Fig. 2; Fig. 6 is a section, partly in elevation on line 6—6, Fig. 2; and Fig. 7 is a section on line 7—7, Fig. 2.

Referring to the drawings by reference characters, I have shown at 10 the main valve body of my reducing valve. This body is provided with a flanged extension 11 forming a high pressure inlet A and a second extension 12 forming a low pressure outlet B. Communication between the inlet and outlet is shown as controlled by means of the valve 14 indicated as seating in a removable valve seat 15. The valve 14 is provided with a stem 16 which may extend above and below the valve.

The lower extremity of the stem passes through a stem guide 17 which is secured in a casing 18. This casing is shown as attached to the lower portion of the main valve body and is arranged to provide space to receive a spring 20. The stem guide 17 and casing 18 may be removably held in place by screw-threads or other fastening means.

The spring 20 abuts at one end against the lower end of the casing and at the other end against an abutment member 21 seated on a shoulder formed on the valve stem 16. It will thus be apparent that the spring 20 serves to keep the main valve seated. A suitable pet cock 22 may be threaded in the lower end of the spring casing 18, if desired.

The upper portion of the main valve body is shown as arranged to receive a removable main valve cylinder 26 in which a piston 25 moves. The upper extremity of the valve stem 16 is fitted in an apertured projection on the piston 25. The cylinder is shown as provided with a shoulder 27 which fits a companion shoulder on the main valve casing but it may be held otherwise if desired.

The chamber formed between the piston 25 and the cylinder 26 communicates through passages 30 with the low pressure outlet. The upper end of the main valve casing is indicated as closed by a cap member 31 which serves to hold the cylinder in place. This cap may be secured by bolts, or other means, as desired.

The main valve casing is provided on opposite sides with outlets 35 on the high pressure side and with two other outlets 36 on the low pressure or outlet side of the casing. The arrangement of the outlets 35 and 36 on the casing in pairs provides for two auxiliary valve members, each alike in detail but right and left handed in construction so that they can be fitted opposite each other.

In initially installing my device, I now intend to place an auxiliary valve on each side of the main valve. One auxiliary valve will be normally open for use while the other will be inactive. The auxiliary valve will be arranged, however, in a manner presently to be described, so that, should it be desired, the valve in use may be put out of operation and the other one put into operation so that the first valve may be removed for repair, if necessary.

The auxiliary valves are alike in arrangement so that the description of one will suffice for both. The auxiliary valve comprises a main auxiliary casing 40 having a passageway aligning with the main valve casing outlet 35 on the high pressure side. The auxiliary valves are secured to the main valve casing by bolts $b$ or equivalent means.

The casing is provided with branches $40^a$ at opposite sides adjacent the top thereof and pair of branches $40^b$ extending laterally from the high and low pressure sides of the valve body with the lands or finished surface of each set of branches preferably lying in a common plane to facilitate the manufacturing of the valve body. A conduit 41 extends from the inlet 35 to the auxiliary valve chamber 42. This chamber arranged in the upper portion of the auxiliary valve casing is closed at the upper end by means of a suitable cap 43 and is provided at the lower end with a removable valve seat 44 on which I show a suitable valve 45 having a depending stem 47. A spring 46 serves to hold the auxiliary valve 45 to its seat.

The casing 40 is provided with a passage through which a stem 48 extends. One end of the stem may contact with the stem 47 of the auxiliary valve, while the other end is headed, as at 50, and the head is shown as resting on a diaphragm 51. The lower surface of the diaphragm rests upon a bearing block 52 which is normally urged upward by a spring 53. This spring is secured within the casing 55, shown as threaded to the lower portion of the auxiliary valve casing 40. The tension of the spring 53 may be adjusted by means of the bolt 56 and lock nut 57. The diaphragm 51, it will be noted, is secured in place between the casing 40 and the cap 55.

The portion of the interior of the casing indicated at 60 above the diaphragm 51 which I term the diaphragm chamber communicates through the passage 61 with the opening 36 to the low pressure side of the main valve. It will thus be apparent, that this diaphragm chamber, when the auxiliary valve is in use, is at all times in communication with the low pressure side of the casing, while the auxiliary valve chamber 42 is at all times in connection with the high pressure side of the casing.

The operation of the device when either one of the auxiliary valves is operated is as follows:

Assuming that a fluid under high pressure communicates with the main valve inlet, and that the low pressure side of the reducing valve communicates with a suitable outlet. When the pressure within the outlet falls, the pressure in the chamber 60 likewise falls, thus reducing the pressure on the diaphragm and causing the spring 53 to move the stem 48 upward. This stem 48 bears upon the lower end of the auxiliary valve 45 and consequently unseats the latter. High pressure fluid is now permitted to flow beneath the auxiliary valve whence it flows through the auxiliary valve chamber into the passageway 65 thence up to the passage 66, laterally through the passage 67 and into the upper portion of the piston chamber.

The increased pressure in the piston chamber causes the piston 25 to move down thereby pushing the main valve from its seat against the pressure of the spring and allowing high pressure fluid to pass through the main valve port into the outlet side of the valve. Fluid continues to pass and the pressure in the outlet side continues to increase until the pressure on the diaphragm 51 is sufficient to overcome the pressure of the spring 53. When this occurs, the auxiliary valve is seated by the spring 46 and thus the supply of high pressure fluid to the piston cylinder 26 is cut off. The spring 20 then forces the main valve 14 to its seat.

In the use of reducing valves, it frequently becomes necessary to regrind the valves or to entirely replace them and my improved structure is particularly well adapted to these repairs. When it is desired to grind the auxiliary valve, the cap 43, closing the upper end of the auxiliary valve chamber is removed and likewise the spring 46. This allows a screw-driver to be inserted in the slot 75 in the upper portion of the valve, and by placing a suitable grinding substance in the valve chamber the valve may be ground. In a similar manner, the main valve 14 may be ground, the stem 16 being slotted at its end 76 to facilitate this grinding action.

Both valve seats of the auxiliary valve 44 and the main valve 15 are indicated as removable so that should the seats become unduly worn, the old one can be removed and a new one inserted without trouble. This greatly adds to the life of the reducing valve.

It frequently happens that solid material or other foreign substances collect in the high pressure side of the reducing valve. To allow the removal of this material, I provide a plug 77 which may be threaded into the lower portion of the inlet so that upon removal of the plug, the foreign matter may be blown out or otherwise removed.

One of the troublesome features occurring in connection with the use of reducing valves lies in the fact that particles of solid matter find their way to the auxiliary valve seat and thus seriously interfere with the operation of this valve. To overcome this difficulty, I have found that the use of a strainer, such as indicated at 78 placed in the communicating line between the low pressure seat of the valve and the auxiliary valve serve to remove all trouble from this source. A threaded plug 79 may serve to hold the strainer 78 in place.

When the reducing valve is initially installed, one of the auxiliary valves will be placed in communication with the main valve while the other will be inactive. To control these valves so that one may be cut off and the other placed in use, I provide suitable cut off valves shown as threaded rods 80, 81, and 82 having coned ends which are adapted to fit cone valve seats in the communicating passages. The valves 80 control the flow of high pressure fluid to the cylinder 26, valves 81 control the low pressure line to the auxiliary valve and valves 82 control the high pressure to the auxiliary valve. Suitable packing glands 83, 84 and 85 serve to render the valves leak-proof. When it is desired to place one of the auxiliary valves out of commission, the valves 80, 81 and 82 on one side will be screwed short, while the valves 80, 81 and 82 on the other side will be opened; thus shutting off communication between the line and auxiliary valve and opening the line to the other.

The main valve 14, it will be noted, is provided with a small projecting lip 90; this lip, when the valve works towards its closed position, prevents the valve from closing with a sudden jar since the pressure, when the valve is closing will gradually be cut off as more of the lip enters the valve port.

In order that the auxiliary valve and the associated parts may be lubricated, if desired, I may provide a suitable grease cup indicated at 91, in Fig. 2. This grease cup may communicate through the cap 43 with the auxiliary valve chamber whence the lubricant may be carried to the various working parts.

To prevent ready access to the adjusting screw 56 which regulates the pressure at which the auxiliary valve operates. I provide a casing 92 for the exposed portion of this adjusting screw. This casing is provided with a lug 93 which is adapted to cooperate with a companion lug 94 carried on the spring casing 55. These lugs are provided with aligned apertures 95 through which a suitable locking means such as a padlock, may be secured to thereby prevent unauthorized persons from tampering with the adjusting screw.

From the foregoing description it will be apparent that I have devised a reducing valve which is extremely simple in construction, which can be economically manufactured and which can very easily be maintained in service condition.

Having thus described my invention, I claim:—

1. In a reducing valve, a main valve, a plurality of auxiliary valves controlling passageways formed in the main and auxiliary valves to extend from the high and low pressure sides of the main valve and means operated independently of the auxiliary valve for closing the passageways whereby one of said auxiliary valves may be bodily removed from association with the main valve while said main valve remains in service.

2. In a reducing valve, a casing, a main fluid control valve therein, an auxiliary valve adapted to operate said main valve and means for permitting placement of a second auxiliary valve in active relation to the main valve including a shut-off valve controlling passageways extending between the high and low pressure sides of the main valve.

3 In a reducing valve, a main valve casing, a main valve therein, a pair of auxiliary valves, mounted on the casing, each auxiliary valve adapted to cooperate with said main valve, and other valve means adapted to render said auxiliary valve active or inactive at will.

4. In a reducing valve, a main valve casing, a main vale therein, an auxiliary valve mounted on the casing, said auxiliary valve adapted to cooperate with said main valve, and means to secure a second auxiliary valve to said casing while the first remains in position including a plurality of valves controlling passageways from the auxiliary valve to the main valve whereby either auxiliary valve may be rendered inactive.

5. In a reducing valve, a main valve, a pair of auxiliary valves removably mounted thereon, each adapted to communicate with and operate said main valve and means to control communication between either auxiliary valve and the main valve so that one of the auxiliary valves may be removed for repair without interfering with the operation of the main valve.

6. In a reducing valve, a main valve casing, a valve therein, a pair of auxiliary valves connected to the main valve by passageways, whereby either auxiliary valve may be actuated by the decreasing pressure in an outlet line to cause high pressure steam to open said main valve and manually operated means for rendering either or both auxiliary valves inactive by closing said passageways.

7. In a reducing valve, a main valve casing, a pair of auxiliary valves mounted on the main valve casing, said main valve being normally held on its seat by a spring, a piston connected to said main valve, a cylinder in the main valve casing, in which said piston is mounted, means to afford communication between the high pressure inlet and the upper portion of said cylinder, and means whereby either one of said auxiliary valves may open communication between the cylinder and the high pressure fluid.

8. In a reducing valve, a main valve casing, a plurality of auxiliary valves mounted on opposite sides of the main valve casing, said main valve being normally held on its seat by a spring, a piston connected to said main valve, a cylinder in the main valve casing, in which said piston is mounted, means to afford communication between the high pressure inlet and the upper portion of said cylinder, said auxiliary valves having communicating openings to the low pressure side of the reducng valve, and means to control the flow of fluid through said communicating openings.

9. In a reducing valve, a main valve casing, a pair of auxiliary valves and casings therefor mounted on the main valve casing, means to hold said main valve to its seat, fluid operated means to move said valve from its seat, said last mentioned means being rendered operative by either of said auxiliary valves and valve means in the main valve casing operatively interposed between the auxiliary valves and the main valve whereby either one of said auxiliary valve casings may be removed while the main valve remains in operation.

10. In a reducing valve, a main valve casing, an auxiliary valve casing, a communicating passage between the auxiliary valve and the low pressure side of said main valve casing, a second communicating passage between the auxiliary valve and the high pressure side of said main valve casing, and valve means disposed in the main valve casing arranged to control the passage of fluid through both of said passages.

11. In a reducing valve having a main valve casing and an auxiliary valve casing, means to afford communication between the auxiliary valve and the low pressure side of the casing and between the auxiliary valve and high pressure side of the casing, and means on the main casing to close said communicating means whereby the auxiliary valve can be removed without shutting off fluid to the main valve casing.

12. In a reducing valve, a main valve casing, a valve therein, and a pair of auxiliary valves and casings therefor attached to the main valve casing, there being passageways formed in the main valve casing and in the auxiliary valve casings, whereby either auxiliary valve may be actuated by the decreasing pressure in an outlet line to cause high pressure steam to open said main valve, and two independent shut off devices carried by the main valve and interposed respectively in the auxiliary valve passageways formed in the main valve casing.

13. In a reducing valve, a main valve casing, a valve therein, and a pair of auxiliary valves mounted respectively in removable casings secured to the main casing, there being communicating passageways between the main valve and auxiliary valves whereby either auxiliary valve may be actuated by the decreasing pressure in an outlet line to cause high pressure steam to open said main valve, and valve means mounted in the main casing for shutting off communication to either auxiliary valve whereby either one may be removed without interrupting operation of the main valve.

14. In a reducing valve comprising a main valve casing having a high pressure inlet and a reduced pressure outlet, a valve port intermediate said inlet and outlet, a valve closing said port, said valve having a stem extending on both sides thereof, a spring acting on said stem and normally urging the valve to its seat, a cylinder, a piston movable in said cylinder and adapted to coact with the valve stem to open said valve, a pair of auxiliary valves secured to said main valve casing, said auxiliary valves being adapted to operate said main valve, and means whereby either one of said auxiliary valves may be used to operate said main valve.

15. In a reducing valve having a main valve casing, a port closing communication through the valve casing, a spring pressed valve normally holding said valve to its seat, a cylinder carried by said casing, a piston movable in said cylinder by high pressure steam to open said valve, and a plurality of auxiliary valves controlling the flow of high pressure steam to said piston, means to operate said valves when the pressure in the outlet side of the reducing valve falls below a predetermined point, and means whereby either one of said auxiliary valves may be used while the other remains inactive.

16. In a reducing valve, a main valve casing, an auxiliary valve casing, communicating passages between the main valve casing and the auxiliary valve casing, and means to close said passages, said means comprising valve members threaded to the main casing and a packing gland adapted to cooperate with said valve to prevent leakage therethrough.

17. In a reducing valve, a main valve casing having a bevelled shoulder thereon, a removable cylinder in said casing, and means on said cylinder coacting with the bevelled portion of the casing to center the cylinder.

18. In a reducing valve, a main valve casing, an auxiliary valve casing, valve seats therein, a main and an auxiliary valve on said seats, and means to afford access to said auxiliary valve, whereby it may be ground without removing it from its casing.

19. In a reducing valve, a main valve casing having a wall dividing the casing into high and low pressure chambers, a valve seat supported by the wall, a valve closure member coacting therewith, a cylinder removably positioned in the low pressure chamber of the valve, a piston therefor, a connecting stem between the piston and valve closure member, a cap on the valve body flanged to maintain the cylinder in rigid relation with the valve body, said cap having an extension formed thereon acting on an aligned extension formed on the piston for limiting movement of the piston.

20. In a reducing valve, a main valve casing having an internal wall dividing the casing into a high and low pressure chamber, a removable valve seat supported by said wall, a valve closure member cooperating with the valve seat to close communication between the high and low pressure chambers, a cylinder removably positioned in the low pressure chamber, a piston mounted therein, a connecting means between the piston and valve closure member, said valve closure member having a surface thereof formed to present a closing end oblique to the plane of the valve seat whereby a gradual closing of the valve is effected when moved by the piston.

21. In a reducing valve, a main valve casing having a high and a low pressure chamber formed therein, auxiliary valves cooperatively arranged relative to the main valve and disposed on opposite sides of the main valve casing, said main valve casing having branches extending outwardly from the walls of the high and low pressure chambers whereby passageways formed in the main valve casing extending from the high and low pressure chambers outwardly through the branches may be aligned with passageways formed in the auxiliary valve casings, a valve closure member yieldingly mounted within the main valve casing to close communication between the high and low pressure chamber, a piston therefor, a connecting means between the valve closure member and piston whereby the latter operates the valve closure member, said main valve casing having other branches formed thereon on opposite sides thereof and adjacent the cylinder housing portions of the casing, said auxiliary valve casings having complementary branches formed thereon, there being passageways in the branches of said casing members whereby when the branches of the auxiliary casing members are superimposed upon the branches of the main casing, communication is established between the high pressure chamber of the main valve casing and one end of the piston and means for removably securing the auxiliary valve casings upon the main valve casing with the respective passageways of the various casing members in alignment.

22. In a reducing valve, a main valve casing having an internal wall dividing the casing interior into a high and low pressure chamber, a removable valve seat member positioned in said wall, a removable cylinder positioned in the low pressure chamber of the casing, a closure cap clampingly securing the cylinder in position within the casing, a piston mounted within the cylinder, a valve closure member coacting with the valve seat to close communication between the high and low pressure chambers, a connecting stem between the piston and valve closure member, a removable bearing for the stem disposed in the low pressure chamber, a spring engaging the stem to maintain the valve closure member seated, a housing for the spring removably secured to the valve casing, said housing constituting a support for said stem bearing member.

In testimony whereof, I hereunto affix my signature.

GEORGE A. SNYDER.